Aug. 29, 1950 R. L. KERR 2,520,215
UNION
Filed Jan. 24, 1947 3 Sheets-Sheet 1
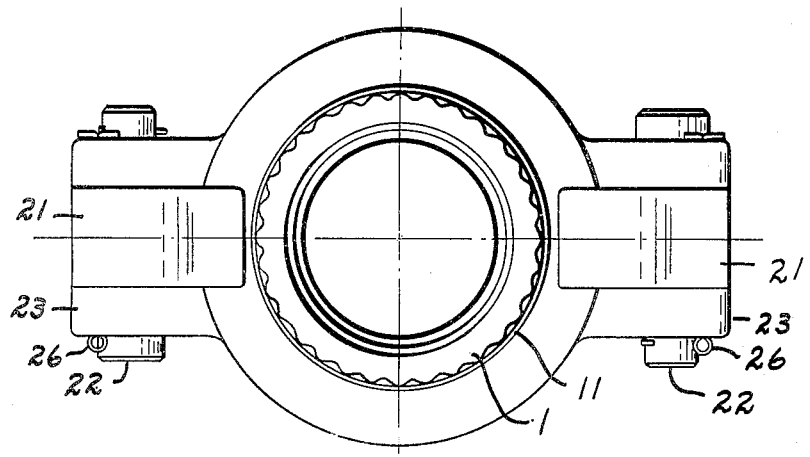
Fig 1
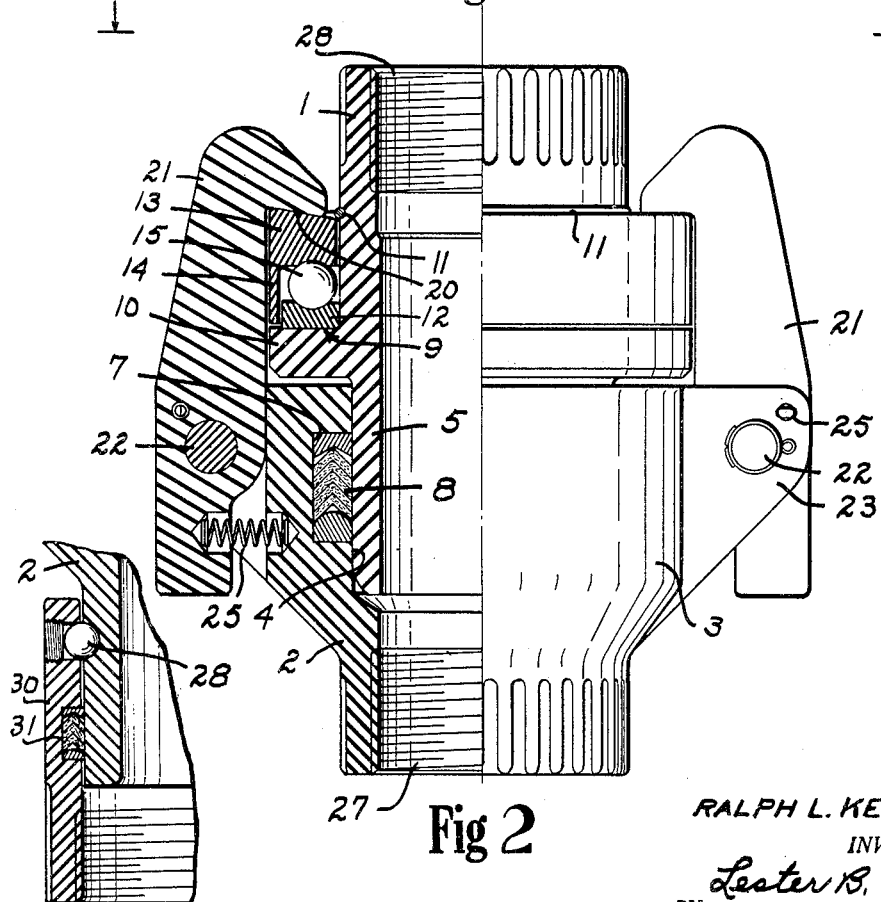
Fig 2
Fig 3
RALPH L. KERR
INVENTOR.
BY Lester B. Clark
& Ray L. Smith
ATTORNEYS Aug. 29, 1950     R. L. KERR     2,520,215
UNION
Filed Jan. 24, 1947     3 Sheets-Sheet 2
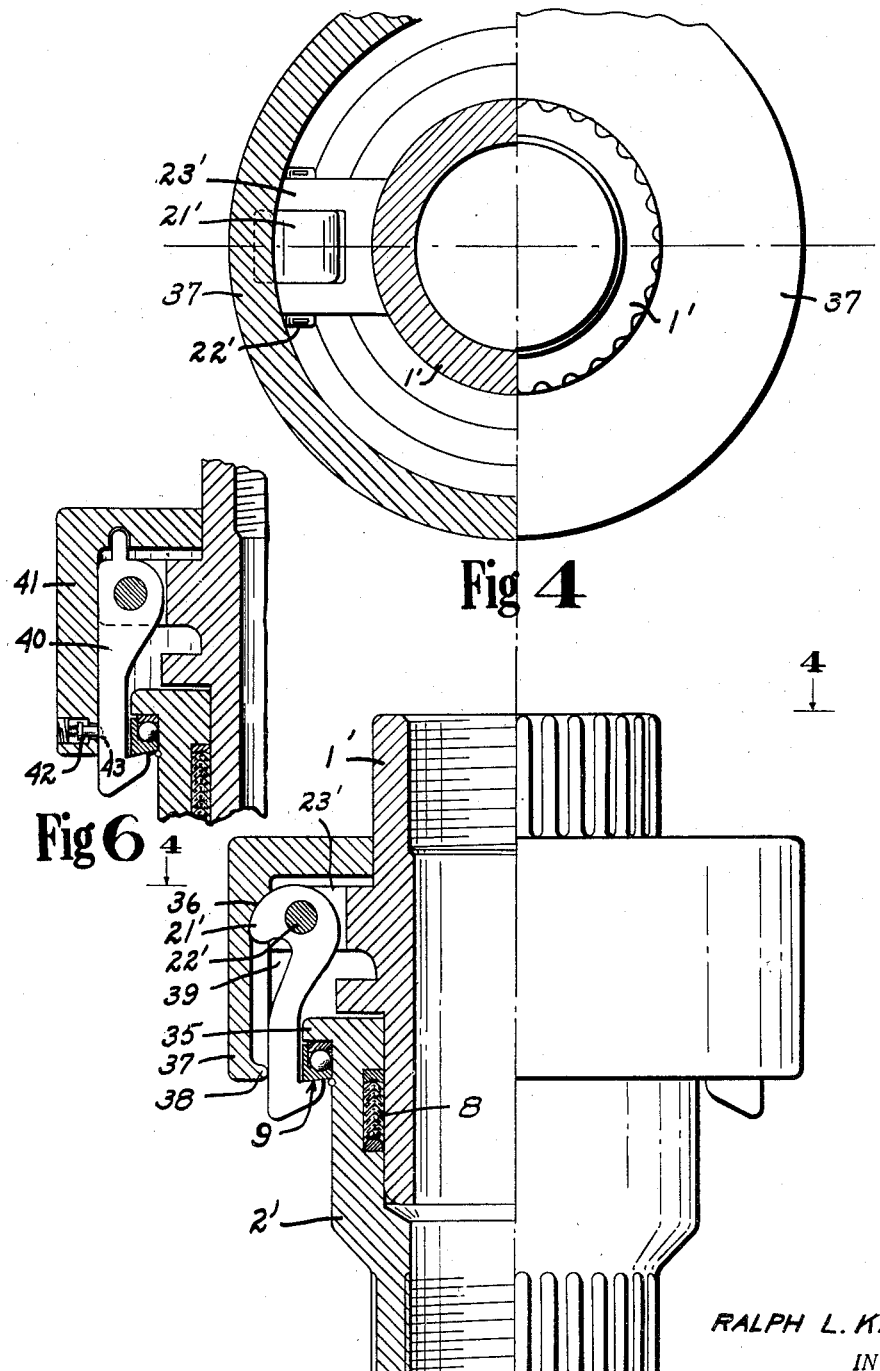
RALPH L. KERR
INVENTOR.
BY Lester B. Clark
& Ray L. Smith
ATTORNEYS

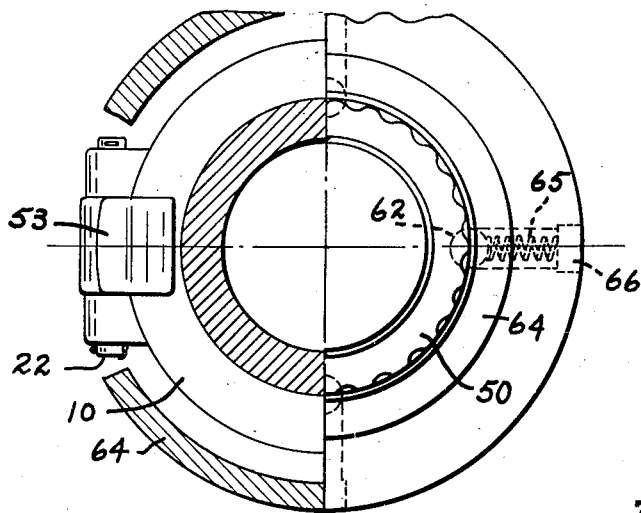
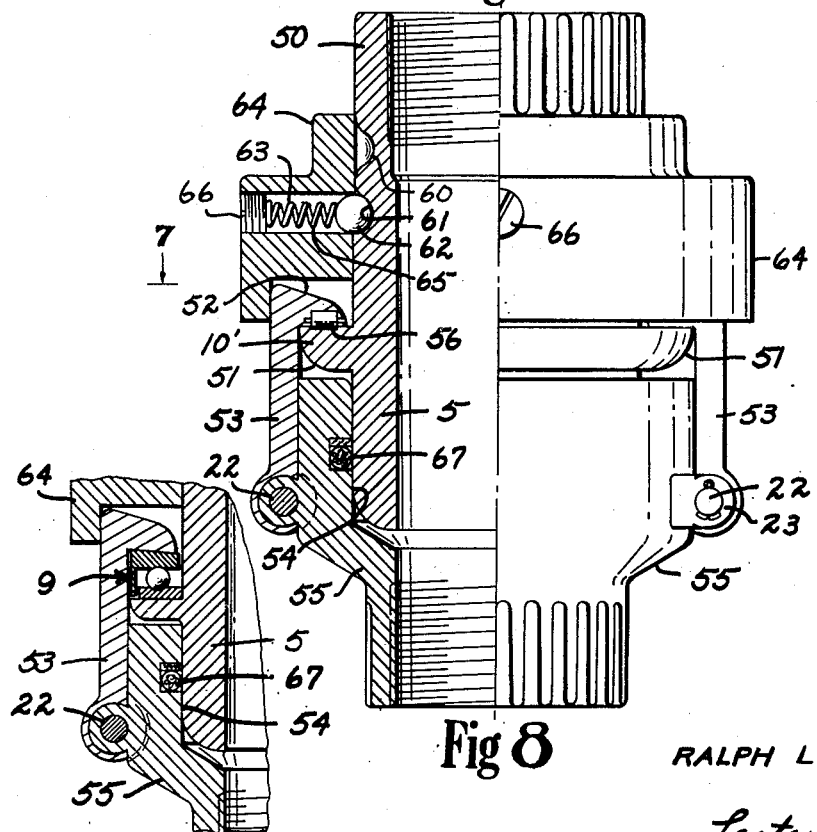

Patented Aug. 29, 1950

2,520,215

UNITED STATES PATENT OFFICE 2,520,215

UNION

Ralph L. Kerr, Houston, Tex.

Application January 24, 1947, Serial No. 723,963

4 Claims. (Cl. 285—97.3)

This invention relates to a union or coupling and more particularly to a device of this type which is capable of freely swiveling when carrying fluids under pressure and which may be readily connected and disconnected at will.

An object of the invention is to provide a swivel union or coupling that may be readily connected or disconnected.

Another object is to provide a union of the class described in which no threading or unthreading is necessary to make up or to release the connection.

Still another object is to provide a union in which there is no tendency to unthread the readily interconnected portions thereof when making up the union, when disconnecting the union, or when the union is in normal use.

A still further object is to provide a union having a non-friction bearing to assume the axial load tending to separate the component parts of the union when internal pressure is applied thereto.

Still another object is the provision of manually operable interlocking members to enable interlocking or release of the union members.

The invention also comprehends the provision of interfitting male and female members and interposed packing so constructed and arranged as to assure a seal between the members, but permitting ready withdrawal of the male member when a disconnection of the union is desired, and also permitting desired swiveling action when the union is in normal use.

The foregoing objects together with other objects and advantages of the invention will be more fully apparent from the following description considered in connection with the accompanying drawings in which:

Fig. 1 is an end view of the union embodying the invention, the view being taken on line 1—1 in Fig. 2;

Fig. 2 is an elevational view in half section of the device;

Fig. 3 is a detail of an alternate construction in which the anti-friction swivel connection is provided by the component parts of one of the union members;

Fig. 4 is a plan view of an alternate construction, the view being taken on line 4—4 in Fig. 5;

Fig. 5 is an elevational view in half section showing details in construction of this form;

Fig. 6 is a detail showing a modified form of locking mechanism for the union;

Fig. 7 is a plan view of an alternate form, certain parts being shown in section and the view being taken on line 7—7 in Fig. 8;

Fig. 8 is an elevational view in half section of this alternate form of the invention; and Fig. 9 is a detail showing the interposition of a ball type of friction bearing between the latching elements and the male member in the form shown in Figs. 7 and 8.

In Figs. 1 and 2 the device is shown as comprising a male member 1 and female member 2, of which the latter is thickened at 3 and has a counterbore 4 to receive the end 5 of the male member. The thickened portion of the female member has an internal groove 7 which receives packing 8, preferably of the chevron type as shown. It is intended that this packing shall be of such type that the end 5 may be readily inserted into or withdrawn from the counterbore 4 and permit relative rotation of the members 1 and 2 and yet will function at all times to prevent leakage between these members when fluid is flowing under pressure through the union.

The male member 1 has a flange 10 intermediate its ends and closely adjacent the end of the female member when these members are interfitting. An anti-friction bearing 9 rests upon this flange and is normally retained in place by means of the snap ring 11. The lower ball race 12 rests upon the flange 7 and the upper race 13 has a depending flange 14, these races together with the interposed balls 15 comprising the bearing assembly and serving, as will be more fully explained, to carry heavy thrusts outwardly of and tending to separate the elements 1 and 2 when the union is in normal use.

The upper surface of the ball race 13 is tapered at 20 for coaction with complementary tapered surfaces on the latch members 21 mounted upon pivots 22 which pass through paired ears 23. The latch members 21 are normally urged toward latching position by compression springs 25 interposed between the lower ends of the latch members and the female or body member 2 and entering opposed recesses in these members.

By virtue of the complementary tapered surfaces on the latches 21 and the upper ball race 13, there is a tendency for the latches to move inwardly to enhance latching when there is pressure within the union tending to separate the members 1 and 2. As an additional factor of safety to assure latching, aligned passages may be formed in the ears 23 and the latch members 21 to receive cotter pins 26, it being understood that such pins will be removed when the latch members 21 are to be tilted to unlatching position to permit withdrawal of the portion 5 of the male members from within counterbore 4 in the female member 2.

The outer ends of the male and female members are threaded or otherwise formed at 27 and 28 to facilitate attachment to tubular sections such as pipe or hose to be interconnected by the union.

In the operation of the union thus far described it is assumed that the union forms a connection between sections of a conduit carrying fluid under pressure. Leakage between the elements 1 and 2 is prevented by the packing 8. At the same time, however, relative rotation between these elements may be readily effected inasmuch as the friction produced by the packing 8 is relatively small and likewise friction within the bearing 9 is small. When pressure is released within the union, and the pins 25 are withdrawn, the latches 21 may be tilted by the application of pressure inwardly upon the lower ends of these latch members whereby the upper ends thereof will move outwardly from position over the bearing 9. Thereupon the member 1 may be readily withdrawn from position within the female member 2. Reconnection may be effected by inserting the lower end 5 of the male member in the upper end of the counterbore 4 and applying axial pressure thereto, and in this manner the latches 21 will be urged outwardly from engagement of the flange 10 with the tapered upper surfaces upon the latch members.

When using the modification shown in Fig. 3, the bearing 9 may be omitted whereby the latch members 21 will engage a complementary surface upon the flange 10. This provides a releasable male-female connection. Swiveling action is provided by surrounding the lower end of the female member 2 with a collar 30 having an internal groove to receive packing 31. Complementary opposed grooves in the member 2 and the collar 30 receive balls 28 so that these parts are maintained in assembled relation and with non-frictional swiveling action therebetween.

In the union shown in Figs. 4 and 5 the male member 1' is provided with paired ears 23' in which the latch members 21' are mounted upon pivots 22'. These latch members extend downwardly and are adapted to engage the nonfriction bearing 9 which surrounds the member 2' adjacent the flange 35 thereon. This construction is provided with packing 8 in the manner shown in Figs. 1 and 2.

Each of the latch members 21' has arcuate outer surface 36 at their upper ends, and a portion of such surface is adapted to fit within a complementary surface within the latch collar 37 fitting slidably upon the periphery of the member 1'. This latch collar has an inwardly extending projection 38 at its lower end and it is intended that such projection shall enter recess 39 formed in the latch member below the pivot 22'. Hence, continued upward movement of the latch collar will effect swinging of the latch members 21' to unlatching position whereby the members 1' and 2' may be readily disconnected. Similarly downward movement of the latch collar 37 when the latches 21' are moved to unlatching position, will force the latches inwardly to effect latching and to lock the latches in such position. It seems apparent that this structure provides for a swivel connection that may be readily connected or disconnected and one in which the latching elements are affirmatively held in latching position when the union is in normal use.

In Fig. 6 the latch member is shown in modified form at 40, the outer surface of this member being linear to fit within the latch collar 41 which is provided with a spring pressed plunger 42 adapted to enter a detent 43 in the latch member so that the latch collar will be releasably retained in latching position.

The structure shown in Figs. 7 and 8 partakes of features shown in prior figures above described. The male member 50 similar to the member 1 previously described, has a flange 10' which is rounded at 51 so that downward movement of the member will cause this surface to engage the upper tapered surface 52 on the latches 53 and urges these latches outwardly to permit entrance of the end 5 of the male member into the counterbore 54 of the female member 55.

Each of the latches 53 has one or more rollers 56 mounted therein to engage the upper face of the flange 10' whereby rolling friction only is had to assume the thrust between members 50 and 55 when internal pressure is applied thereto. This anti-friction structure may be replaced by the bearing structure 9 shown in Fig. 9 and also shown in Figs. 1 and 2 and previously described.

The member 50 is provided with spaced detents 60 and 61 engageable by ball 62 in the bore 63 in latch collar 64. The ball 62 is constantly urged inwardly by compression spring 65 held within the bore 63 by screw cap 66. This structure releasably holds the lock collar either in a lowermost position as shown whereby the latches 53 are held in latching position, or in an elevated position whereby the latches 53 are swingable outwardly so that the member 64 may be withdrawn from within the counterbore 54 or inserted thereinto in utilizing the union in the normal and intended manner.

In this embodiment the annular groove within the female member is shown as of such radial and axial extent as to loosely receive a toroidal or O-ring 67 which normally permits free sliding movement of the end 5 of the male member into or from within the counterbore 54 but which functions, upon the application of internal fluid pressure in the union members, to maintain a seal between the members and thereby prevent any leakage through the union when in use.

Broadly the invention comprehends a union of novel construction which may be readily connected or disconnected but which is capable of withstanding high internal pressures without leakage and at the same time enabling swiveling action between the interconnected elements thereof.

The invention claimed is:

1. A union of the class described including, male and female members having complementary interfitting parts, a flange on one of the members, an antifriction bearing surrounding said one member and having a raceway in engagement with said flange and the other raceway having an inwardly tapered outer surface, a plurality of latch members pivotally mounted on the other of the members, extending axially thereof and having an overhanging tapered portion movable to overlie and engage said tapered outer surface of the bearing raceway, said latch members being tiltable to release the flanged member whereby the male and female members may be separated.

2. A union of the class described including, male and female members having complementary interfitting parts, a flange on one of the members, a plurality of latch members pivotally mounted upon the other of the members, there being an inwardly extending tapered surface on each of the latch members, an antifriction thrust bearing surrounding said one member and in engagement with said flange, the outermost surface of the bearing raceway being complementary to the tapered surface on the latch members, whereby the latch members are urged to their innermost latching position when pressure within the union tends to separate the male and female members.

3. A fluid conducting swivel including, a female member having a counterbore therein, a male member having an end position adapted to enter said counterbore, a flange on the male member overlying the end of the female member, latch members pivotally mounted on the female member, extending longitudinally of the member, and terminating in inwardly tapered end portions, an antifriction bearing engaging said flange and having its outer race surface complemental to the tapered surfaces on the latch members whereby the female and male members are swivelly interlocked when internal pressure is applied thereto.

4. A fluid conducting swivel including, a female member having a counterbore therein, a male member having an end position adapted to enter said countrebore, a flange on the male member overlying the end of the female member, a plurality of latch members pivotally mounted on one of the members movable to an inward position to engage the other of the members and to restrain the members from separation from fluid pressure internally thereof, said latch members terminating in inwardly tapered end portions, and a bearing surface on said flange having its outer axial face complemental to the tapered surfaces on the latch members, whereby the male and female members, are interlocked when internal pressure exists in the swivel.

RALPH L. KERR.

REFERENCES CITED

The following references are of record in the file of this patent:

UNITED STATES PATENTS

| Number | Name | Date |
| --- | --- | --- |
| 946,935 | Clay | Jan. 18, 1910 |
| 964,238 | Goss | July 12, 1910 |
| 1,946,316 | Friend | Feb. 6, 1934 |